United States Patent [19]
Mieda et al.

[11] Patent Number: 6,058,100
[45] Date of Patent: May 2, 2000

[54] OPTICAL RECORDING MEDIUM HAVING PIT ROWS

[75] Inventors: Michinobu Mieda, Shiki-gun; Junji Hirokane; Akira Takahashi, both of Nara; Kenji Ohta, Kitakatsuragi-gun; Shigeo Terashima, Tenri, all of Japan

[73] Assignee: Sharp Kabushiki Kaisha, Osaka, Japan

[21] Appl. No.: 08/928,042

[22] Filed: Sep. 11, 1997

Related U.S. Application Data

[62] Division of application No. 08/468,776, Jun. 6, 1995, Pat. No. 5,673,250.

[30] Foreign Application Priority Data

Jul. 6, 1994  [JP]  Japan ................................ 6-154735

[51] Int. Cl.[7] ........................................................ G11B 7/00
[52] U.S. Cl. ................................. 369/275.4; 369/275.3; 369/277
[58] Field of Search ............................ 369/275.4, 275.3, 369/13, 277, 100, 109, 108, 112, 53, 54, 58, 32, 47, 44.26, 275.1

[56] References Cited

U.S. PATENT DOCUMENTS

| | | | |
|---|---|---|---|
| 5,383,176 | 1/1995 | Inui et al. ............................. | 369/275.4 |
| 5,448,552 | 9/1995 | Onagi ................................... | 369/275.4 |
| 5,508,995 | 4/1996 | Moriya et al. ....................... | 369/275.4 |

FOREIGN PATENT DOCUMENTS

| | | |
|---|---|---|
| 3714804 A1 | 11/1988 | Germany . |
| 4212663 A1 | 1/1993 | Germany . |
| 58-23333 | 2/1983 | Japan . |
| 63-57859 | 11/1988 | Japan . |
| 2-156423 | 6/1990 | Japan . |
| 02210642 | 8/1990 | Japan . |
| 04195939 | 7/1992 | Japan . |
| 04311821 | 11/1992 | Japan . |
| 5-81717 | 4/1993 | Japan . |
| 06111480 | 4/1994 | Japan . |
| 07029186 | 1/1995 | Japan . |
| 07050014 | 2/1995 | Japan . |
| 07153081 | 6/1995 | Japan . |

OTHER PUBLICATIONS

"Improvement of Track Density by Land and Groove Recording on Phase Change Optical Disk," N. Miyagawa et al., *Conference Digest*, Joint International Symposium on Optical Memory and Optical Data Storage, 1993, pp. 57–58.

"Suppression of Crosstalk by Control of Groove Depth in Recording on Land and Groove," N. Miyagawa et al., *Abstracts of the 53rd Lecture Meeting held by Applied Physics Association*, No. 3, 18a–T–3, 1992, page 948.

"Super Resolution in Magneto–Optical Disks," M. Kaneko et al., *Journal of Applied Magnetics Institute*, vol. 15, No. 5, 1991, pp. 838–844.

*Primary Examiner*—Ali Neyzari
*Attorney, Agent, or Firm*—Dike, Bronstein, Roberts & Cushman, LLP; David G. Conlin; William J. Daley, Jr.

[57] ABSTRACT

Grooves and lands are provided to a magneto-optical disk so as to be alternately arranged, and recording bit strings are formed on the grooves and lands respectively so that information is recorded. Moreover, pit rows are formed on boundary sections between the adjoining grooves and lands so that address information of a recording/reproducing track is recorded, and the pit rows are formed every other boundary section. When the grooves and the lands are scanned as the recording/reproducing track by a light, an address of the recording/reproducing track is read out from the pit rows, and successively, discrimination is made whether the recording/reproducing track which is scanned by an optical spot is the groove or the land. This prevents crosstalk which causes inclusion of address information in the next pit rows, thereby, making it possible to obtain accurate address information. Moreover, since a total number of formed pit rows can be decreased and accuracy in a shape of pits is relieved, an optical recording medium can be easily produced.

20 Claims, 11 Drawing Sheets

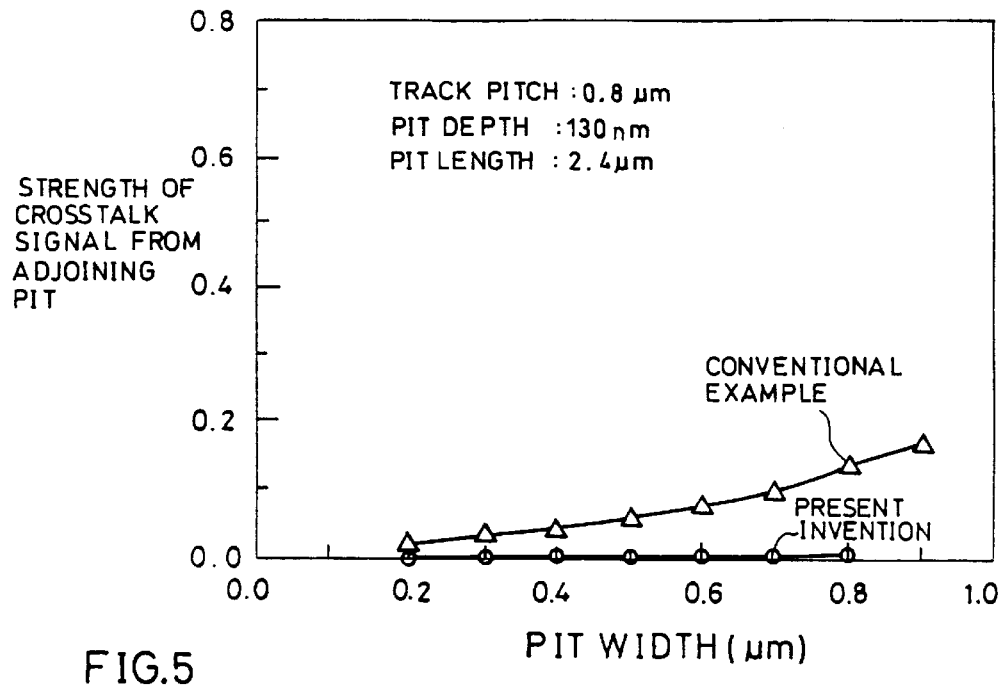
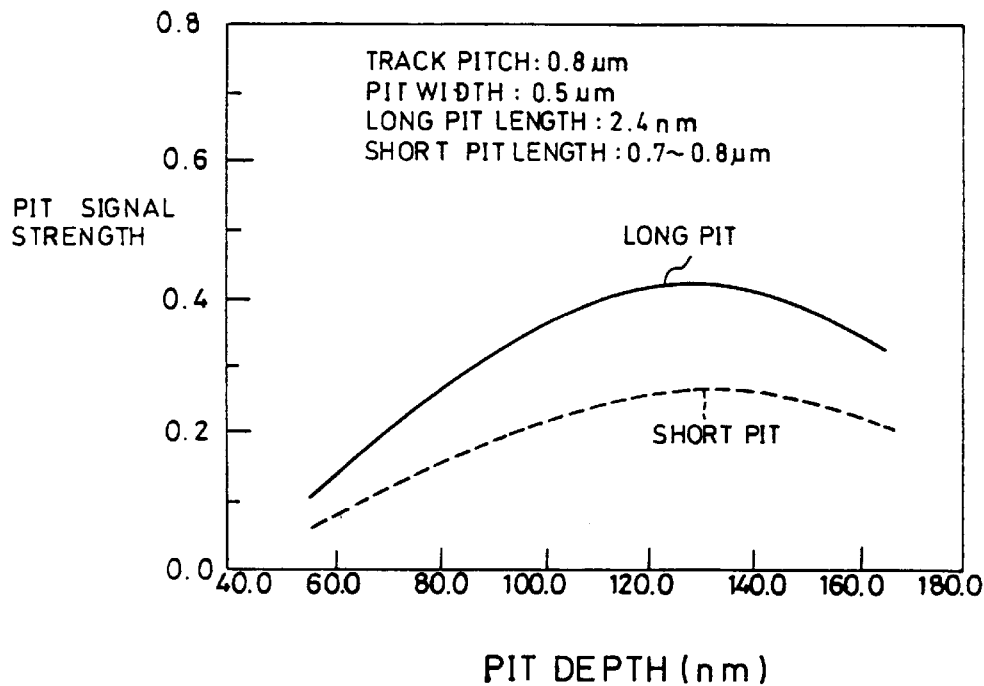

OPTICAL RECORDING MEDIUM HAVING PIT ROWS

This application is a divisional of U.S. application Ser. No. 08/468,776, filed Jun. 6, 1995, now U.S. Pat. No. 5,673,250.

FIELD OF THE INVENTION

The present invention relates to an optical recording medium and a reproducing method for an optical recording medium such as a magneto-optical disk where address information of a recording/reproducing track has been preliminarily recorded by a pit row.

BACKGROUND OF THE INVENTION

A magneto-optical disk has been researched and developed as an optical disk which is capable of rewriting, and part of magneto-optical disks has been already put to practical use as an outer memory for a computer.

A magneto-optical disk is characterized by that its recording capacity is larger than that of a floppy disk or a hard disk utilizing an in-plane magnetization film because a vertical magnetization film is used as a recording medium so that recording and reproducing are carried out by using a light.

As shown in FIG. 12, address information of a track where information is recorded and reproduced is recorded on a land 52 by a pit row 53 between grooves 51.51 formed in a magneto-optical disk so that the address information of the track corresponding to the land 52 which is scanned by an optical spot 55 can be obtained.

A track pitch is set as an about value which is same as diameter of the optical spot 55, and a diameter of the optical spot 55 is determined by a wavelength of a laser beam and a numerical aperture of an object lens for converging the laser beam as an optical spot 55. A wavelength of a laser beam is usually 780 to 830 nm, and a numerical aperture of the object lens is 0.45 to 0.6. Therefore, a diameter of the optical spot 55 becomes 1.2 to 1.4 $\mu$m, and the track pitch is also set as 1.4 to 1.6 $\mu$m. For this reason, a size of a recording domain 54 in which magnetization is upward or downward becomes about 0.8 $\mu$m which is a smallest value.

In recent years, in such a magneto-optical disk, a system for forming a plurality of magnetic layers of a recording film so as to reproduce recording bit which is smaller than the optical spot 55 by a magnetic super-resolution is suggested in order to improve recording density (For example, see Japanese Unexamined Patent Publication 5-81717/1993 (Tokukaihei 5-81717) and Japanese Journal of Applied Magnetics 1991, vol. 15, No. 5, pp.838–845). According to these suggestions, since a recording bit with a size of ½ of the above one can be reproduced, a track pitch can be also reduced to substantially ½, namely, about 0.8 $\mu$m.

In addition, as shown in FIG. 13, in a phase-changing-type optical disk in which a recording domain 58 is formed on a groove 56 and a land 57, a method for reducing crosstalk of a recording signal which is entrance of noise from adjoining tracks (for example, (1) CONFERENCE DIGEST 1992 No. 3, 18a-T-2, pp.948; 53rd SYMPOSIUM ON APPLIED PHYSICS and (2) Improvement of track density by land and groove recording on phase change optical disk; CONFERENCE DIGEST July, 1993 pp. 57–58; JOINT INTERNATIONAL SYMPOSIUM ON OPTICAL MEMORY AND OPTICAL DATA STORAGE).

However, with the above conventional arrangement, when a track pitch is ½, for example, a distance between pits 53 on the adjoining tracks becomes ½. For this reason, crosstalk which causes inclusion of an address signal of the pit row 53 on a next track becomes larger, so there arises a problem that accurate address information cannot be obtained.

In addition, when the pit row 53 which gives address information respectively is formed on the groove 56 and the land 57, there also arises a problem that a process for producing an optical disk becomes complex.

SUMMARY OF THE INVENTION

It is an object of the present invention to provide an optical recording medium and a reproducing method for the optical recording medium which is capable of preventing crosstalk from entering address information of a track obtained by a pit row irregularly formed in an optical recording medium from address information obtained from a next pit row, and also to provide an optical recording medium which can be produced by a simplified process.

In order to achieve the above object, an optical recording medium of the present invention is characterized by that:

(1) grooves and lands, said grooves and lands being alternately provided, recording bit strings being formed in said grooves and lands;

(2) boundaries between said adjoining grooves and lands; and (3) pit rows representing address information of a recording/reproducing track, said pit rows being formed on boundaries between said lands and grooves every other boundary section.

With the above arrangement, the pits rows representing address information are formed on the boundary section between the adjoining grooves and lands every other boundary section, the adjoining pit rows are separated each other at a distance of a width of the groove+a width of the land. In other words, a distance from a center of the groove or the land where a pit row has been formed on its boundary section to a center of a pit row which has been formed on a next boundary section becomes 1.5 times to 2.5 times the width of the groove or the land.

Therefore, in an optical recording medium where recording bits are formed on both the grooves and the lands so that a track pitch is reduced to ½, even in the case where the grooves and the lands are irradiated by an optical spot with a conventional size and a recording bit is read out by the above-mentioned magnetic super-resolution, a pit row formed on a next boundary section is not positioned in the optical spot. As a first effect, when address information is read out from a certain pit row, crosstalk which causes inclusion of address information of a next pit row is prevented, thereby making it possible to obtain an accurate address information.

In addition, as a second effect, since adjoining pits rows are sufficiently separated from each other, change in an amount of crosstalk with change in a width of a pit is decreased. Moreover, since the pit rows are formed on boundary sections between the grooves and the lands, when recording bits are reproduced with a center of the optical spot positioned in a center of the grooves or lands, any pit rows are irradiated in a peripheral portion of the optical spot so that address information is read out. When the pit row is irradiated in the peripheral portion of the optical spot, strength of light diffraction becomes weaker. As a result, the dependence of strength of a signal obtained from a pit row on a width of a pit also becomes smaller as a third effect. In this way, after the above-mentioned second and third effects are obtained, since accuracy required for a shape of a pit is relieved, formation of an optical recording medium becomes easy.

Furthermore, since it is not necessary to form pit rows which give address information on the groove and land respectively, a total number of pit rows can be greatly reduced as a fourth effect, thereby making it possible to easily form an optical recording medium.

Here, a mark portion with peculiar refractive index (discriminating pit, for example) may be formed on each groove or each land.

As a result, discrimination can be easily made whether a recording/reproducing track, which is being irradiated by the optical spot, is a groove or land by detecting the mark portion based upon change in strength of a reflected light.

In other words, in the case where the mark portion is not formed, when both the grooves and the lands are the recording/reproducing tracks, a same address is given from a same pit row on a boundary section to the recording/reproducing track of the groove and the recording/reproducing track of the land. However, discrimination between the groove and the land to which the same address has been given can be easily made by providing the mark portion either of each groove or each land.

Next, in order to achieve the above object, a reproducing method for an optical recording medium of the present invention, the optical recording medium comprising, (1) grooves and lands which are alternately arranged, where address information of a recording/reproducing track is recorded (2) boundary sections between the grooves and lands and (3) pit rows which are formed on the boundary sections every other boundary section, the method includes:

the first step of when the grooves or lands as the recording/reproducing track in the optical recording medium is scanned by a light in a direction of a track, reading out an address of the recording/reproducing track from the pit rows; and the second step of discriminating whether the recording/reproducing track which is scanned by the light is the groove or land.

With the above arrangement, as explained about the optical recording medium of the present invention, when the grooves or the lands are scanned by a light as the recording/reproducing track, any pit rows are irradiated in the peripheral portion of the optical spot so that their address information is read out, but a pit row which has been formed on a next boundary section does not enter the optical spot. As a result, when address information is read out from a certain pit row, crosstalk which causes inclusion of address information on a next pit row is prevented, thereby making it possible to obtain accurate address information.

At this time, in both the recording/reproducing track of the groove and the recording/reproducing track of the land, a same address is read out from a same pit row on a boundary section between the groove and the land. However, since the reproducing method for the optical recording medium includes the step of discriminating whether the recording/reproducing track which is scanned by the light is the groove or land, a recording/reproducing track, which is scanned by a light based upon accurate address information, can be accurately specified.

Here, discrimination can be made as to whether a recording/reproducing track which is scanned by a light is a groove or a land by detecting polarity of a tracking signal.

Generation of a tracking signal is indispensable for making an optical spot track a groove or land. Negative/positive polarity of the tracking signal is reversed so that a trail track is switched to a groove or a land. Therefore, discrimination between grooves and lands can be easily made by storing polarity of a tracking signal without addition of a special arrangement.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a graph which shows a change in strength of a crosstalk signal with a width of a pit by comparing the present invention with a conventional example.

FIG. 5 is a graph which shows dependence of the strength of the pit signal obtained by the arrangement of the pit rows shown in FIG. 1 on a depth of a pit.

DESCRIPTION OF THE EMBODIMENTS

Embodiment 1

The following will discuss one embodiment of the present invention.

Figure 1:
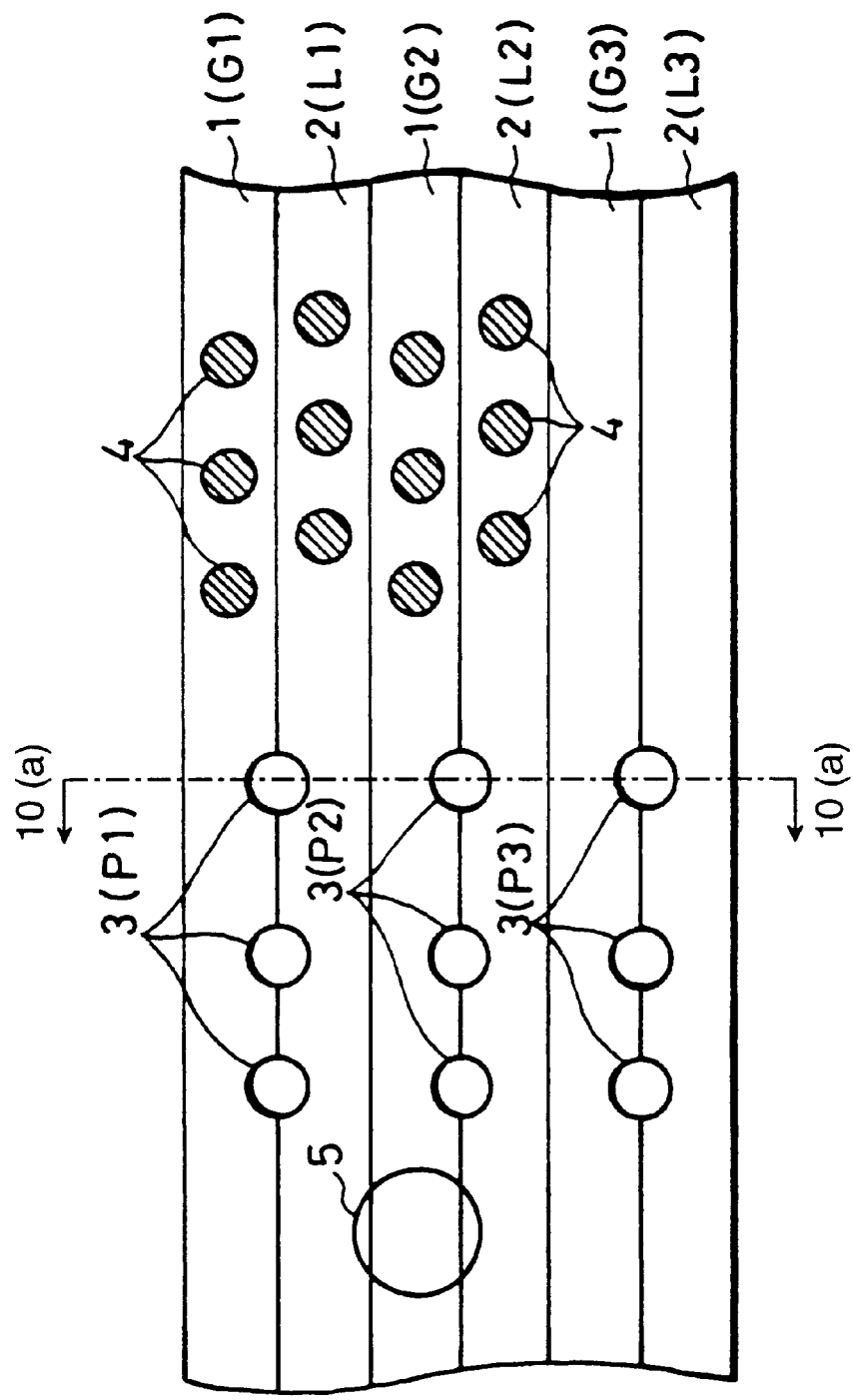
FIG. 1 is a plan view which schematically shows an arrangement of a magneto-optical disk of the present invention which is provided with pit rows giving address information.

As shown in FIG. 1, a groove 1 and a land 2 between the grooves 1.1 are formed so as to have a spiral or concentric circular shape in a magneto-optical disk of the present embodiment. Since information is recorded to the groove 1 and the land 2 as a recording bit string 4, each cycle of the groove 1 and the land 2 becomes a track for recording and reproducing. Moreover, a width of the groove 1 and a width of the land 1 are set as a same value so that quality of a reproduced signal of the recording bit string 4 which has been recorded in the groove 1 and quality of a reproduced signal of the recording bit string 4 which has been recorded in the land 2 become substantially same.

A pit row 3, mentioned later in detail, are formed on a boundary section between the adjoining groove 1 and land 2, and it is formed on every other boundary section. Address information which shows an address of each recording/ reproducing track on a magneto-optical disk is recorded by the pit row 3.

For convenience of explanation, as shown in FIG. 1, sub symbols [G1, G2, G3] are added to each groove 1 in this order, and sub symbols [L1, L2, L3], [P1, P2, P3] are added in this order to each land 2 and each pit row 3. In the case where the following explanation will require discrimination in each groove 1, the subsymbols will be used. This applies similarly to the land 2 and pit row 3.

Here, adjoining groove 1 and land 2 are considered as one group. Namely, it is considered that adjoining groove G1 and land L1, adjoining groove G2 and land L2, and adjoining groove G3 and land L3 compose one group.

As is clear from FIG. 1, a series of the pit rows 3 is formed per group of the groove 1 and the land 2. Namely, a pit row P1 is formed on a boundary section between the groove G1 and the land L1, a pit row P2 on a boundary section between the groove G2 and the land L2, and a pit row P3 on a boundary section between the groove G3 and the land L3. In other words, the pit rows 3 are formed on the boundary sections between the adjoining grooves 1 and the lands 2 every other boundary section.

In this case, since address information of the groove G1 and the land L1 is recorded by the pit row P1, a same address is given to the groove G1 and the land L1. Similarly, a same address is given to the groove G2 and the land L2 by the pit row P2, and a same address is given to the groove G3 and the land L3 by the pit row P3.

FIG. 10(a) shows a view 10a—10a cross section of a substrate 7 in which the pit row 3 has been formed on the boundary section between the groove 1 and the land 2. In FIG. 10(a), the pit row 3 is formed on the boundary section between the groove 1 and the land 2 by digging a corner on a top surface of the land 2 and successively digging a corner on a bottom surface of the groove 1.

With the above arrangement, when the recording bit string 4 is formed by the optical spot 5 with high power and information is recorded to a magneto-optical disk, and when the recording bit string 4 is scanned by the optical spot 5 with low power so that the information is reproduced from the magneto-optical disk, tracking with respect to the groove 1 or tracking with respect to the land 2 is controlled.

As shown in FIG. 1 as an example, when the optical spot 5 scans a recording/reproducing track of the groove G2, address information can be obtained from the pit row P2 which has been formed on the boundary section between the groove G2 and the land L2. At this time, in the present embodiment, since the pit row 3 is arranged on the every other boundary section between the adjoining groove 1 and the land 2, intervals of the adjoining pit rows 3 become twice the track pitch. Further, a relationship between a center of irradiation by the optical spot 5 and the pit row 3 will be explained. A distance between a center of the groove G2 corresponding to a center of irradiation by the optical spot 5 and the next pit row P1 becomes 1.5 times the track pitch and a distance between the center of the groove G2 and the oppositely next pit row P3 become 2.5 times the track pitch.

As a result, since a radius of the optical spot 5 is smaller than the track pitch, when the optical spot 5 scans the pit row 2, for example, the pit row P1 and the pit row P3 which adjoin the pit row P2 are separated fairly from a range of irradiation by the optical spot 5. Therefore, compared to the case where pit rows are formed on both the groove and the land, crosstalk from an adjoining pit row becomes very small, thereby making it possible to obtain accurate address information.

In a similar manner, also when the optical spot 5 scans a track of the land L2, accurate address information can be obtained from the pit row P2.

At this time, discrimination between the recording/ reproducing track of the groove G2 and the recording/ reproducing track of the land L2 can be easily made by detecting the polarity.

Here, in general, the tracking signal is a signal which is generated by a push-pull method. Positive/negative polarity of the tracking signal is reversed so that a trailing track is switched to the groove or the land. Therefore, when the optical spot 5 irradiates the groove 1 and the land 2, the polarity of the tracking signal is reversed. For this reason, the discrimination between the groove and the land can be easily made only by storing the reversed polarity and by detecting the polarity of the tracking signal. In such a manner, it is not necessary to add a special arrangement for discrimination between a groove and a land.

Therefore, upon recording and reproducing using the groove G2 or the land L2 as a recording/reproducing track, even when same address information is obtained from the same pit row P2, it can be easily discriminated which recording tracks of the groove G2 or the land L2 is being used for recording and reproducing by detecting polarity of a tracking signal.

Figure 2:
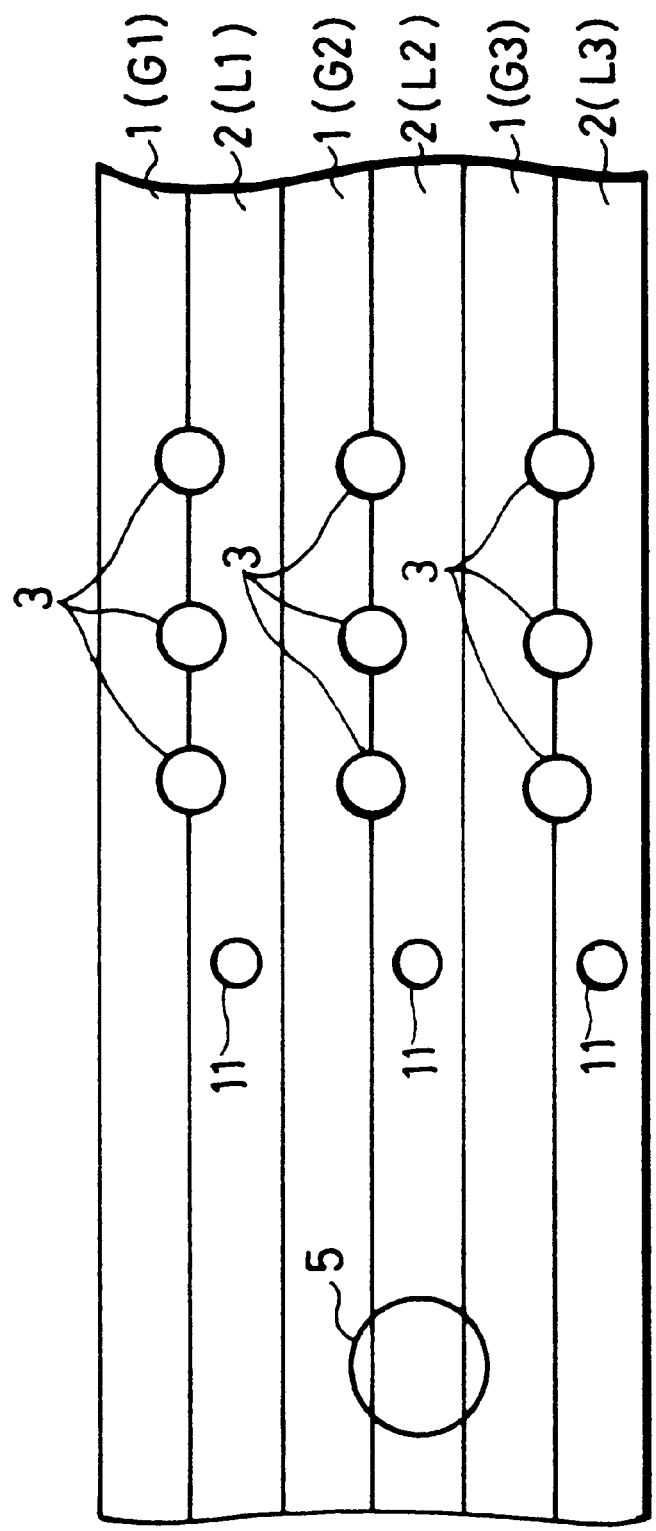
FIG. 2 is a plane view which schematically shows an arrangement of a magneto-optical disk which is provided with a discriminating pits and pit rows of the present invention.

In addition, in another method of discriminating between the groove 1 and the land 2, as shown in FIG. 2, a discriminating pit 11 is preliminarily formed on either of each groove 1 or each land 2, and discrimination can be made by using a reproducing signal from the discriminating pit 11. Here, the discriminating pit 11 may be formed on a position before or after the optical spot 5 scans the pit rows 3. Moreover, in FIG. 2, the discriminating pit 11 which has been formed in one position is shown, but in order to prevent omission of detection of the discriminating pit 11, a plurality of discriminating pits 11 may be formed so as to make a row.

As shown in FIG. 2, in the case where the discriminating pit 11 is formed on each land 2, when refraction index of the substrate is n, a wavelength of the optical spot is $\lambda$, it is suitable that the discrimination pit 11 is formed so as to have a depth of about $\lambda/4n$, a width of about 0.3 T to 0.4 T. The reason is that in this case, a reproduced signal of the discriminating pit 11 becomes maximum and that crosstalk from the adjoining discriminating pit 11 is restrained. Here, a width of the discriminating pit 11 means a length of a magneto-optical disk to a radial direction.

In addition, when the optical spot 5 scans the land 2, strength of a reproduced signal obtained from the discriminating pit 11 is different from strength of a signal obtained from the pit row 3, so both the signals can be clearly discriminated from each other. Meanwhile, when the optical spot 5 scans the groove 1, since the discriminating pit 11 on the land 2 is hardly irradiated by the optical spot 5, strength of a signal obtained from the discriminating pit 11 is much smaller than the case where the optical spot 5 scans the land 2. Therefore, the groove 1 and the land 2 can be discriminated by change in the strength of the signal obtained from the discriminating pit 11.

In the present embodiment, when the pit row 3 is formed on the boundary section between the groove G2 and the land L2, for example, and the optical spot 5 scans the groove G2, the pit rows 3 are arranged on a right side towards a direction in which the optical spot 5 moves. However, the pit row s 3 can be formed on the boundary section between the groove G2 and the land L1, for example, and can be arranged on a left side towards the direction in which the optical spot 5 moves. It does not make any difference in an amount of signal obtained from the pit rows 3 which cases are chosen, but when compatibility with optical disks is considered, it is necessary to specify a relative position of the grooves 1 or the lands 2 to the pit rows 3.

Next, the following will discuss a method of managing an address.

Figure 8A:
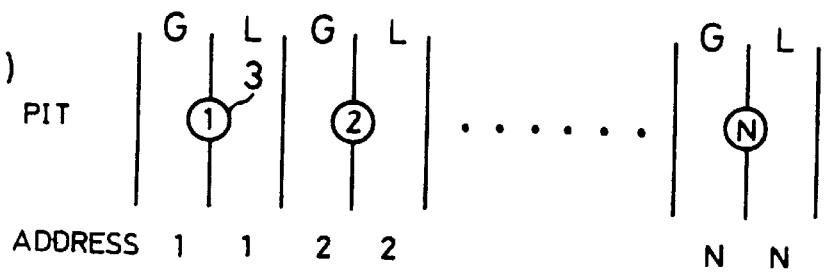
FIGS. 8(a) through 8(d) are explanatory drawings which concretely show methods for managing addresses of recording/reproducing tracks in the arrangement of the pit rows shown in FIG. 1.

In a first method, as shown in FIG. 8(a), addresses are recorded by the pit rows 3 so as to successively increase or decrease by one. A groove and a land where the pit rows 3 is formed on their boundary section are managed by a same address. In this case, since an address which has been read out from the pit rows 3 is directly used, there exist an advantage that an address can be easily managed compared to a method of converting an address which has been read out from the pit rows 3 into an address of a groove or a land.

Figure 8B:
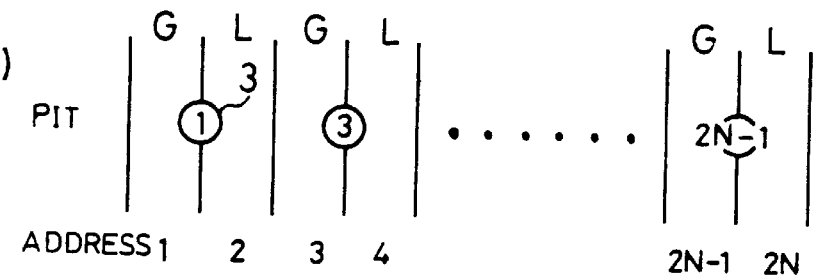

Next, in a second method, as shown in FIG. 8(b), each pit row 3 is formed so that addresses increase or decrease by twos. Then, an address which is same as the pit row 3 is specified for either of a groove or a land and an address is specified for the other by adding or subtracting 1 to or from the address of the pit row 3. As a result, the groove and the land where the pit rows 3 has been formed on their boundary section are managed by different addresses. In this case, since the addresses continues in a radial direction of the optical disk, there exists an advantage that access to a recording/reproducing track of a target address is easy.

Figure 8C:
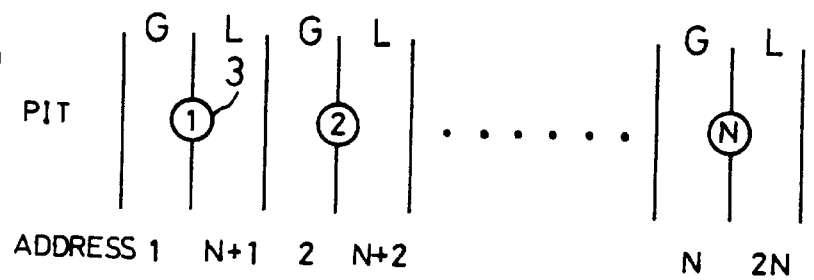

In addition, in a third method, as shown in FIG. 8(c), similarly to the first method, each pit row 3 is formed so that addresses increase or decrease by one. Then, an address which is same as of the pit row 3 is specified for either of a groove or a land, and for the other, conversion is made according to a formula (address of pit row)+(total number of tracks)/2 so that an address is specified. As a result, the groove and the land where the pit row 3 has been formed on their boundary section are managed by different addresses. In this case, since addresses continue on the groove and the land respectively, when a target recording/reproducing track is accessed by retrieving the continued addresses, servo switching is not required for the groove and the land, thereby making it possible to increase its accessing speed.

Figure 8D:
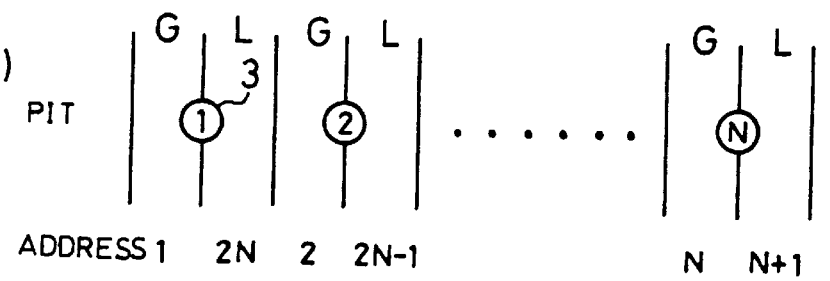
Figure 9A:
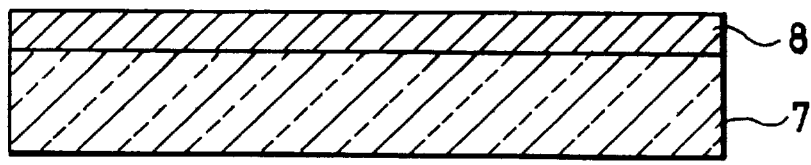
FIGS. 9(a) through 9(f) are longitudinal cross sections which schematically show processes for producing a magneto-optical disk having the arrangement shown in FIG. 1 in an order of carrying out.
Figure 9B:
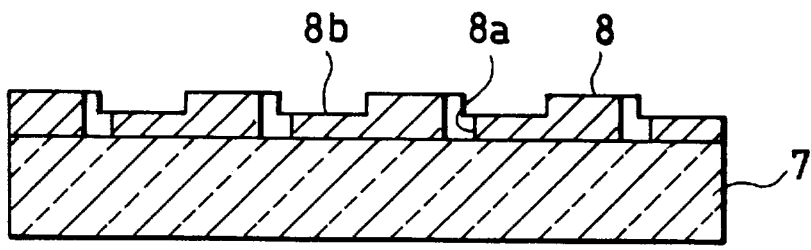
Figure 9C:
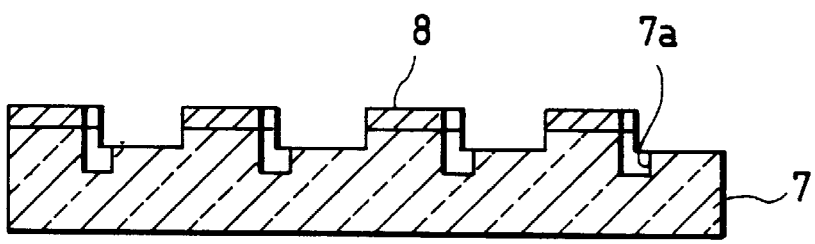
Figure 9D:
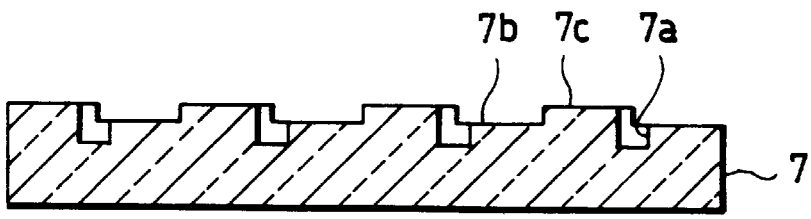
Figure 9E:
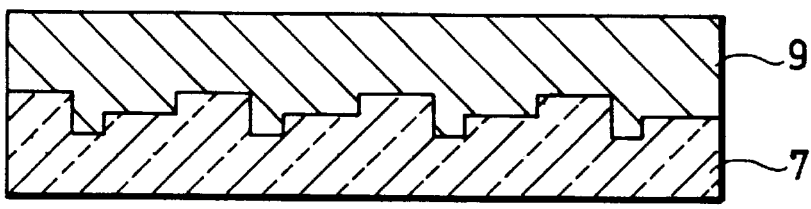
Figure 9F:
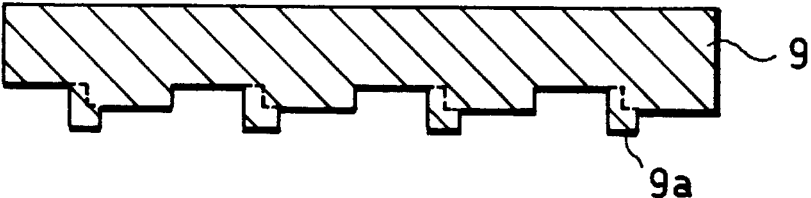

In addition, in a fourth method, as shown in FIG. 8(d), similarly to the first method, each pit row 3 is formed so that addresses increase or decrease by one. Then, a same address as that of the pit row 3 is specified for either of a groove or a land, and for the other, conversion is made according to a formula (total number of tracks)−(address by pit row)+1 so that an address is specified. As a result, the groove and the land where the pit row 3 has been formed on their boundary section are managed by different addresses. In this case, when a target recording/reproducing track is accessed by retrieving the continued addresses, servo switching is not required for the groove and the land. Furthermore, since as to the last address of the pit row, (total number of tracks)/2 and (total number of tracks)/2+1 are addresses of adjoining groove and land, after arrival at the last address of the pit row, a next target track may be successively searched, thereby making it possible to increase its accessing speed.

The method of managing addresses of a groove and a land is not limited to the above methods, but in the case where compatibility with optical disks is considered, it is necessary to specify any of the address managing methods.

Next, the following will discuss a pit shape which is suitable for the pit row 3 of the present invention.

Figure 3:
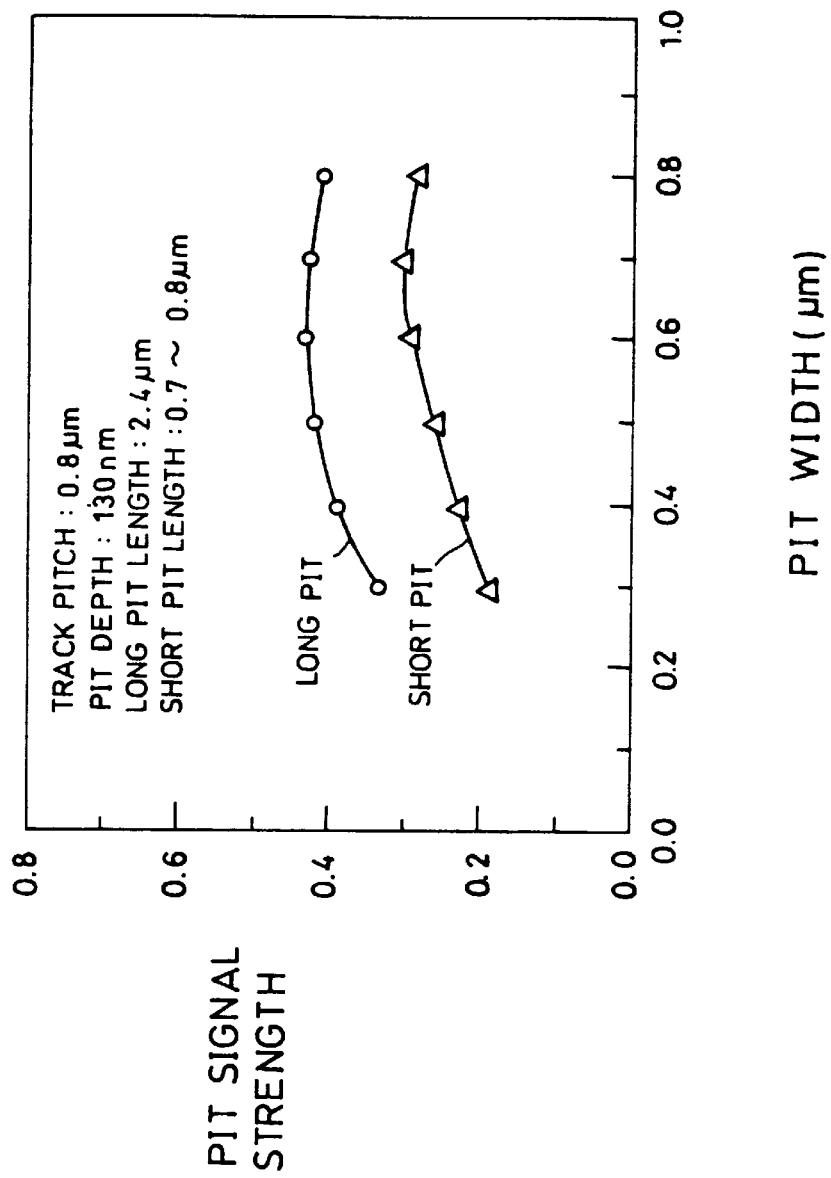
FIG. 3 is a graph which shows dependence of strength of a pits signal obtained by the arrangement of the pit rows shown in FIG. 1 on a width of pits.

FIGS. 3 through 5 are graphs which show results of obtaining a relationship between diffraction strength and a pit shape of the pit row 3 when the optical spot 5 scans the land 2 in the case where widths of the groove 1 and the land 3 are respectively 0.8 μm (namely, the track pitch is 0.8 μm).

Here, polycarbonate with refractive index n of 1.58 was used as a substrate so that a groove with depth of 55 nm was formed. Moreover, a wavelength of the reproduced light λ is 780 nm, a numerical aperture of an object lens for converging NA is 0.55. Here, strength of a signal was obtained as a ratio of the substrate to reflecting strength in a flat portion.

FIG. 3 shows a change in strength of a pit signal with respect to a change in width of a pit when a length of each pit of the pit row 3 is constant. Here, a pit had two kinds of lengths: 2.4 μm (long pit) and 0.7 to 0.8 μm (short pit), and the depth of a pit was 130 nm. Since a short pit row was formed in a cycle of 1.52 μm, the short pit row was slightly influenced by a next short pit, and the signal strength became smaller compared to the case where only one short pit is irradiated by the optical spot 5. Here, the width of a pit means a width of a magneto-optical disk with respect to a radial direction, and the length of a pit means a length of a magneto-optical disk with respect to a radial direction, namely, a direction of a track.

FIG. 4 shows a result of obtaining a relationship between a width of a pit and strength of a crosstalk signal which enters from the next pit row 3 when the length of a pit is 2.4 μm and the depth of a pit is 130 nm.

According to the results of FIGS. 3 and 4, in the present invention, strength of a pit signal substantially exceeds 0.2 when the width of a pit is in a range of 0.3 to 0.7 μm. Furthermore, crosstalk from the adjoining pit row 3 substantially becomes 0, thereby making it possible to sufficient address signals.

FIG. 5 shows a change in strength of a pit signal with respect to a change in a depth of a pit when each width of pits of the pit row 3 is 0.5 μm. Here, similarly to the case of FIG. 3, a pit was formed so as to have two kinds of lengths:

2.4 μm (long pit) and 0.7 to 0.8 μm (short pit), and a short pit row was formed in a cycle of 1.52 μm. A result of the long pit was represented by a solid line and the short pit by broken lines.

According to the result of FIG. 5, in the present invention, strength of the pit signal substantially exceeds 0.2 when a depth of a pit is in a range of 100 to 160 nm, thereby making it possible to obtain sufficient address signals.

In addition, also in the case where the optical spot 5 scans the groove 1, the same result as the case where the optical spot 5 scans the land 2 can be obtained.

Figure 11:
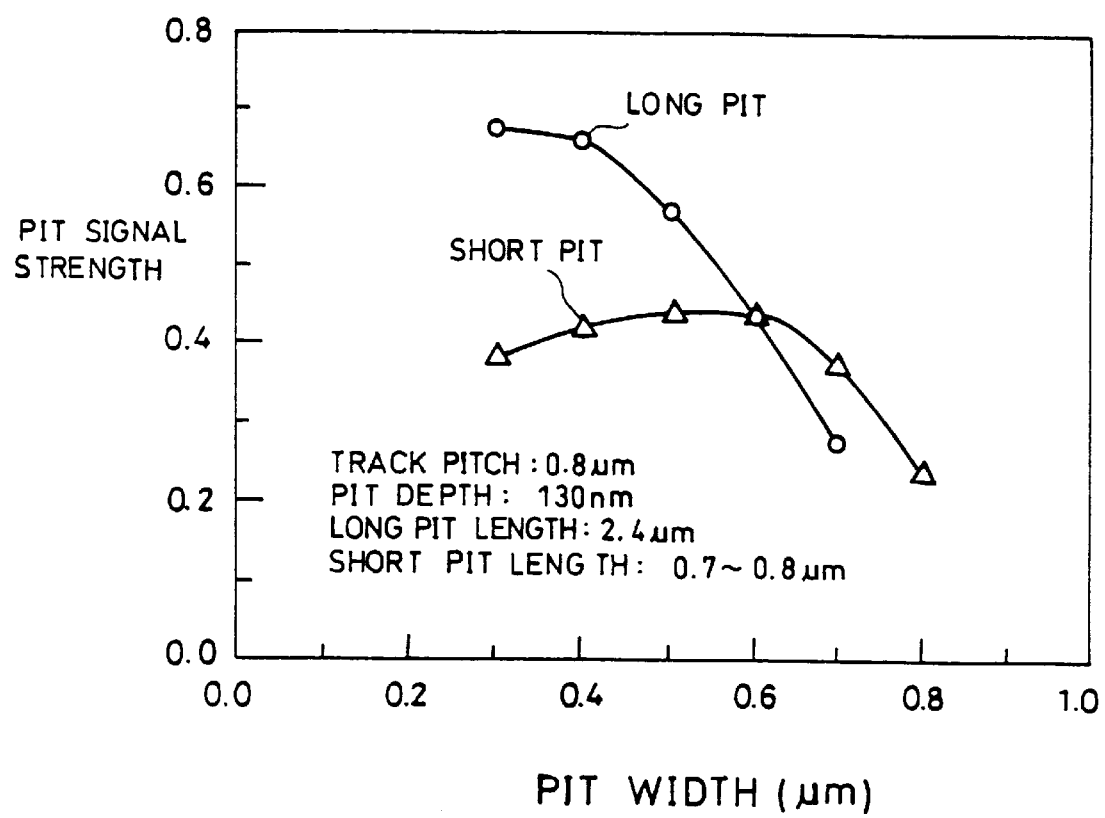
FIG. 11 is a graph which shows dependence of strength of a pit signal obtained from a pit row which gives address information on a width of pits in a magneto-optical disk with a conventional arrangement.
Figure 12:
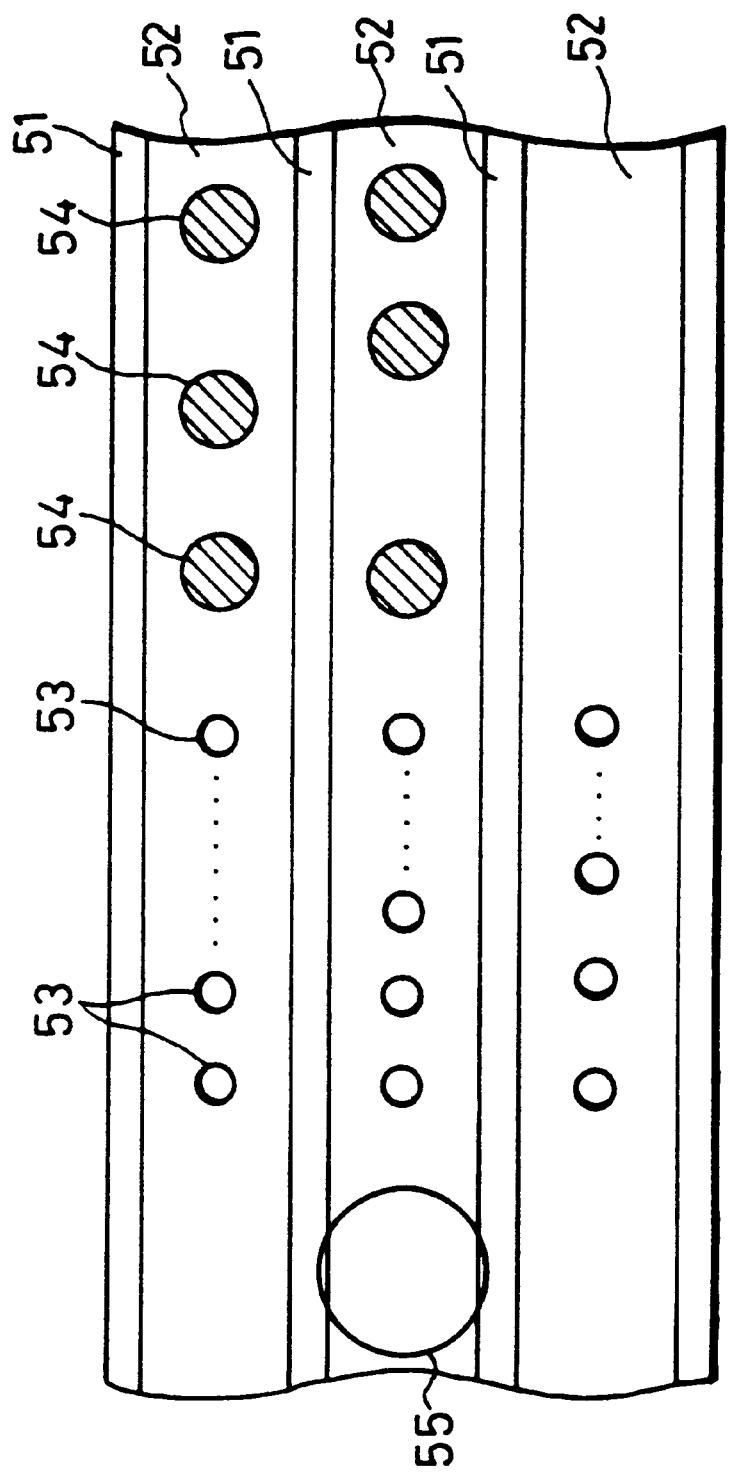
FIG. 12 is a plan view which schematically shows an arrangement of a magneto-optical disk having conventional pit rows.
Figure 13:
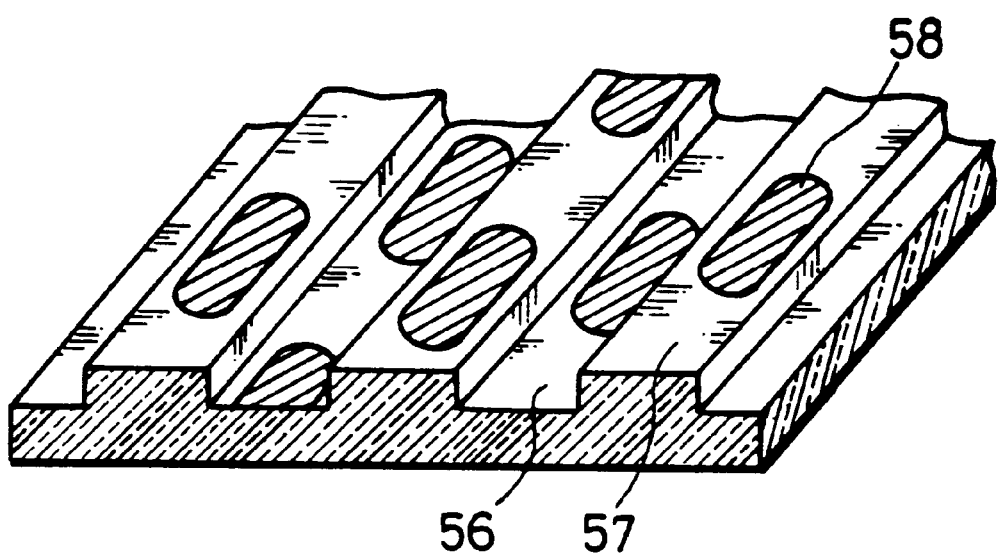
FIG. 13 is a perspective view which schematically shows an arrangement of a conventional phase-changing type optical disk.

Here, for comparison, FIGS. 4 and 11 show results of obtaining a relationship between diffraction strength of a pit row and a shape of a pit in a pit row by respectively forming a pit row on a groove and a land with width of 0.8 μm. As shown in FIGS. 4 and 11, numerical values relating to a shape of a pit in the present invention and in a conventional example for comparison have same conditions.

According to results of FIGS. 4 and 11, in the conventional example, strength of a pit signal is strong, but as a pit width becomes wider, an amount of crosstalk from an adjoining pit row increases. Therefore, it is hard to obtain an accurate address signal. Moreover, according to the result of FIG. 11, in the conventional example, it is found that dependence on a pit width is high particularly in the strength of a pit signal in a long pit. As a result, in the conventional example, when a pit row with an accurate shape is not formed, error detection of an address signal occurs and an amount of crosstalk is liable to increase.

In this point, as is clear from the results of FIGS. 3 and 4, since in the present invention, dependence on a pit width is low in strength of a pit signal and in an amount of crosstalk, accuracy which is required for a shape of a pit in the pit row 3 is relieved, and formation of the pit row 3 becomes easy.

A degree of dependence on a pit width in strength of a pit signal is related to a degree of light diffraction due to a pit. In the conventional example, since a pit row is formed in the center of a groove or a land and each pit is irradiated in a middle portion of an optical spot, a degree of light diffraction becomes high. Meanwhile, with the present invention, since the pit row 3 is formed on a boundary section between the adjoining groove 1 and the land 2, the pit row 3 is irradiated in an outer circumference of the optical spot 5 which irradiates the center of the groove 1. When the pit row 3 is irradiated in the outer circumference of the optical spot 5, strength of light diffraction becomes weak. Therefore, the strength of a pit signal should become smaller than the conventional example, but the dependency on a pit width can be smaller instead.

Next, results of obtaining a relationship between strength of diffraction by the pit row 3 and the shape of a pit in the pit row 3 when the optical spot 5 scans the land 2 in the case where the track pitch is changed are shown in Tables 1 and 2e. For comparison, results in the conventional example where a pit row was formed on a groove and a land with width of 0.8 μm respectively are also shown in Tables 1 and 2.

In Table 1, a substrate is polycarbonate with refractive index of 1.58, a depth of the groove is 55 nm. A wavelength $\lambda$ of a reproduced light is 780 nm, a numerical aperture NA of an object lens for converging is 0.55, and a depth of a pit is 130 nm.

Meanwhile, conditions of Table 2 are same as of Table 1 except that the wavelength $\lambda$ of the reproduced light is 680 nm, a radium of an optical beam $r_0$ ($1/e^2$ of central strength) is changed from 0.60 in Table 1 to 0.55.

TABLE 1

$\lambda$ = 780 nm NA = 0.55 $r_0$ = 0.60 n = 1.58
track depth = 55 nm

| Track pitch (μm) | Pit width (μm) | Long pit signal | Short pit signal | Crosstalk signal in the present invention | Crosstalk signal in the conventional example |
|---|---|---|---|---|---|
| 0.8 | 0.3 | 0.34 | 0.19 | 0.001 | 0.032 |
|  | 0.4 | 0.39 | 0.23 | 0.001 | 0.045 |
|  | 0.5 | 0.42 | 0.26 | 0.001 | 0.060 |
|  | 0.6 | 0.43 | 0.30 | 0.001 | 0.077 |
|  | 0.7 | 0.43 | 0.31 | 0.003 | 0.098 |
|  | 0.8 | 0.41 | 0.29 | 0.007 | 0.141 |
| 0.7 | 0.3 | 0.37 | 0.21 | 0.001 | 0.065 |
|  | 0.4 | 0.42 | 0.25 | 0.002 | 0.084 |
|  | 0.5 | 0.43 | 0.28 | 0.006 | 0.105 |
|  | 0.6 | 0.42 | 0.31 | 0.011 | 0.127 |
|  | 0.7 | 0.39 | 0.31 | 0.018 | 0.168 |
|  | 0.8 | 0.34 | 0.27 | 0.028 | 0.200 |
| 0.6 | 0.2 | 0.32 | 0.17 | 0.002 | 0.084 |
|  | 0.3 | 0.39 | 0.22 | 0.004 | 0.115 |
|  | 0.4 | 0.42 | 0.26 | 0.008 | 0.141 |
|  | 0.5 | 0.41 | 0.28 | 0.014 | 0.165 |
|  | 0.6 | 0.37 | 0.30 | 0.023 | 0.200 |
|  | 0.7 | 0.31 | 0.29 | 0.035 | 0.227 |
| 0.5 | 0.2 | 0.33 | 0.18 | 0.026 | 0.139 |
|  | 0.3 | 0.40 | 0.23 | 0.038 | 0.182 |
|  | 0.4 | 0.41 | 0.26 | 0.053 | 0.213 |
|  | 0.5 | 0.37 | 0.27 | 0.070 | 0.242 |
|  | 0.6 | 0.29 | 0.29 | 0.090 | 0.260 |

TABLE 1-continued $\lambda = 780$ nm NA $= 0.55$ $r_0 = 0.60$ n $= 1.58$
track depth $= 55$ nm

| Track pitch (μm) | Pit width (μm) | Long pit signal | Short pit signal | Crosstalk signal in the present invention | Crosstalk signal in the conventional example |
|---|---|---|---|---|---|
| 0.4 | 0.2 | 0.34 | 0.19 | 0.045 | 0.207 |
|  | 0.3 | 0.39 | 0.23 | 0.080 | 0.262 |
|  | 0.4 | 0.38 | 0.26 | 0.109 | 0.297 |
|  | 0.5 | 0.31 | 0.27 | 0.134 | 0.307 |
|  | 0.6 | 0.21 | 0.28 | 0.179 | 0.306 |

Figure 6:
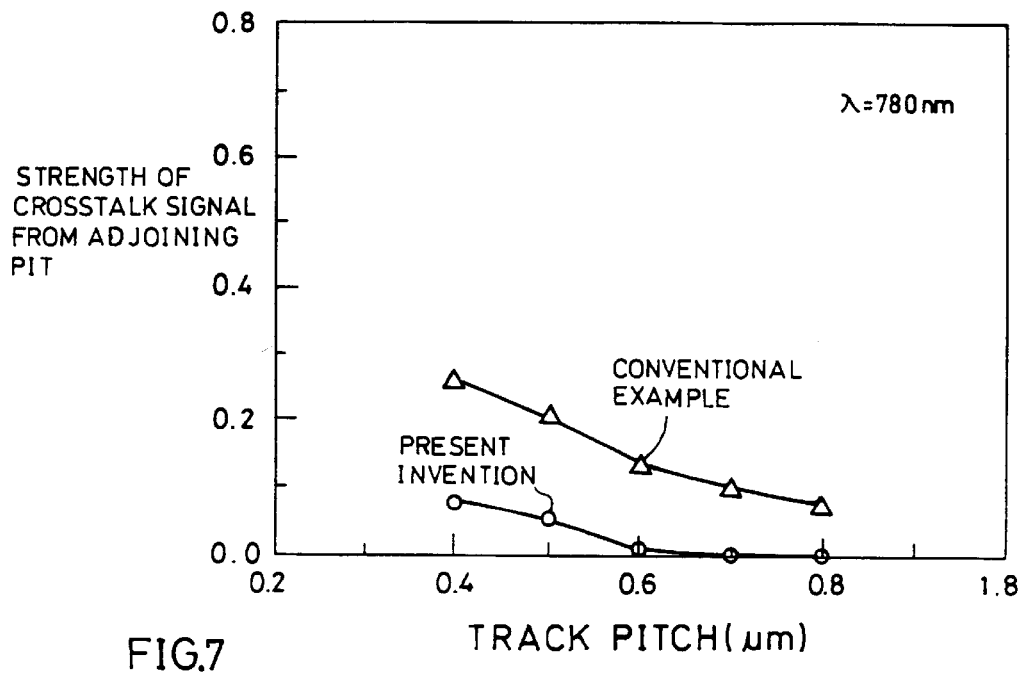
FIG. 6 is a graph which shows a change in strength of a crosstalk signal with a track pitch by comparing the present invention with a conventional example.

In Table 1, a pit width in which a long pit signal becomes maximum is selected for each track pitch in both the present invention and the conventional example, and values of a crosstalk signal which enters from a next long pit row at this time are underlined. A graph which has been obtained by plotting the underlined values against the track pitches is shown in FIG. 6.

TABLE 2

$\lambda = 680$ nm NA $= 0.55$ $r_0 = 0.55$ n $= 1.58$
track depth $= 55$ nm

| Track pitch (μm) | Pit width (μm) | Long pit signal | Short pit signal | Crosstalk signal in the present invention | Crosstalk signal in the conventional example |
|---|---|---|---|---|---|
| 0.7 | 0.3 | 0.31 | 0.22 | 0.000 | 0.035 |
|  | 0.4 | 0.35 | 0.27 | 0.001 | 0.045 |
|  | 0.5 | 0.37 | 0.30 | 0.003 | 0.055 |
|  | 0.6 | 0.37 | 0.33 | 0.006 | 0.064 |
|  | 0.7 | 0.35 | 0.34 | 0.010 | 0.101 |
|  | 0.8 | 0.32 | 0.30 | 0.016 | 0.118 |
| 0.6 | 0.2 | 0.28 | 0.19 | 0.001 | 0.051 |
|  | 0.3 | 0.34 | 0.25 | 0.004 | 0.067 |
|  | 0.4 | 0.37 | 0.29 | 0.007 | 0.078 |
|  | 0.5 | 0.36 | 0.31 | 0.013 | 0.085 |
|  | 0.6 | 0.33 | 0.34 | 0.021 | 0.117 |
|  | 0.7 | 0.27 | 0.32 | 0.031 | 0.127 |
| 0.5 | 0.2 | 0.31 | 0.21 | 0.011 | 0.091 |
|  | 0.3 | 0.36 | 0.26 | 0.018 | 0.111 |
|  | 0.4 | 0.36 | 0.30 | 0.028 | 0.118 |
|  | 0.5 | 0.31 | 0.31 | 0.040 | 0.139 |
|  | 0.6 | 0.24 | 0.32 | 0.055 | 0.137 |
| 0.4 | 0.2 | 0.33 | 0.23 | 0.046 | 0.149 |
|  | 0.3 | 0.36 | 0.27 | 0.064 | 0.169 |
|  | 0.4 | 0.32 | 0.30 | 0.081 | 0.182 |
|  | 0.5 | 0.24 | 0.31 | 0.096 | 0.205 |
|  | 0.6 | 0.13 | 0.30 | 0.109 | 0.188 |

Figure 7:
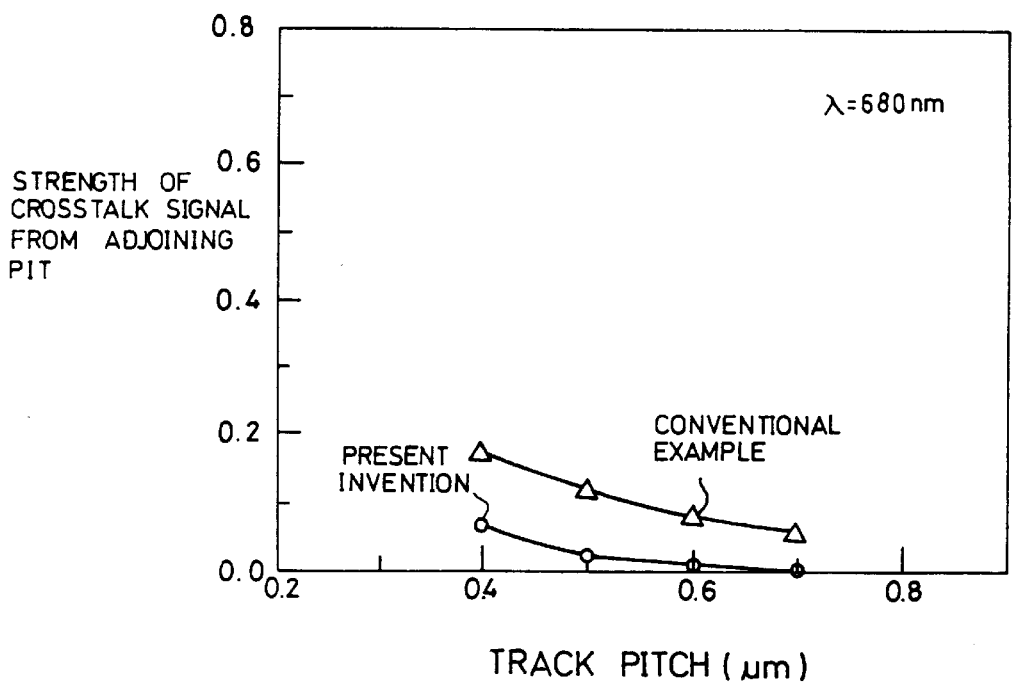
FIG. 7 is a graph which shows a change strength of a crosstalk signal with a track pitch by comparing the present invention with a conventional example when a wavelength of a light used for obtaining a result of FIG. 6 is changed.

In Table 2, a pit width in which a long pit signal becomes maximum is selected for each track pitch in both the present invention and the conventional example, and values of a crosstalk signal which enters from a next long pit row at this time are underlined. A graph which has been obtained by plotting the underlined values against the track pitches is shown in FIG. 7.

As is clear from values the long pit signals and the short pit signals in Tables 1 and 2, in the present invention, even when the track pitch is 0.4 μm, sufficient signal strength which exceeds 0.2 can be obtained. According to results of Table 1 and FIG. 6, when the wavelength λ is 780 nm and when the track pitch is up to approximately 0.6 μm, the strength of a crosstalk signal from a next pit row is enough weak, so an excellent pit signal can be obtained. Moreover, according to results of Table 2 and FIG. 7, when the wavelength λ is 680 nm and when the track pitch is up to approximately 0.5 μm, the strength of a crosstalk signal from a next pit row is enough weak, so an excellent pit signal can be obtained.

On the contrary, in the conventional example, when the track pitch is narrowed, the strength of a crosstalk signal from a next pit row sharply increases, so it is hard to obtain an accurate pit signal.

Here, the above embodiment explains a pit shape which is suitable for the case where the wavelength λ is 780 nm and 680 nm, a numerical aperture NA of the object lens is 0.55 and refractive index n of the substrate is 1.58. More generally speaking, when the track pitch is represented by T (in the present invention, it corresponds to each width of the groove 1 and the land 2), the pit width by Pw, the pit depth by Pd, the wavelength by λ and the refractive index of the substrate by n, the track pitch T can be narrowed such that the following relationship holds:

$$T \geq 0.35 \times \lambda / NA,$$

at this time, when the pit width Pw is as follows:

$$0.4T \leq Pw \leq 1.2T,$$

an enough excellent pit signal can be obtained.

Moreover, in a range of $T \geq 0.35 \times \lambda/NA$ and $0.5 T \leq Pw \leq 1.0 T$, a pit signal with higher quality can be obtained, which is preferable. Furthermore, when the pit depth is within a range of $\lambda/6n \leq Pd \leq \lambda/3n$, an enough excellent pit signal can be obtained.

In the case where a magnetic super-resolution recording medium which is disclosed in Japanese Unexamined Patent Publication No.5-81717/1993 (Tokukaihei 5-81717) is used, for example, as a magneto-optical recording medium, size of a recording bit 4 can be reduced to approximately 0.4 μm and crosstalk from a next track considerably is decreased at the time of reproducing a recording bit. As a result, even when a track width (in the present invention, each width of the groove 1 and the land 2) is not more than 0.8 μm, recording and reproducing can be easily carried out, so the present invention is particularly suitable.

When the above-mentioned magnetic super-resolution recording medium is applied to the present embodiment, the track pitch can be not more than 0.8 μm, thereby making it possible to greatly improve recording density. Furthermore, accurate address information can be obtained by the present invention.

In addition, when the wavelength of the laser beam to be used for recording and reproducing is shortened, the track pitch can be further shortened. For example, if the wavelength of the laser beam is shortened from 830 nm to 458 nm, the track pitch can be shortened to approximately ½, thereby making it possible to heighten recording density.

Next, the following will discuss the process for mastering a magneto-optical disk shown in the present embodiment referring to FIGS. 9(*a*) through 9(*f*).

First, as shown in FIG. 9(*a*), photoresist 8 is applied on one side of a substrate 7 composed of quartz glass. Next, a laser beam is converged on the photoresist 8, and the photoresist 8 is exposed according to desired patterns of the groove 1 and the pit row 3. At this time, power of the laser beam at the time of forming the pattern of the pit row 3 is made stronger than the power of the laser beam at the time of forming the pattern of the groove 1. After the exposed photoresist 8 is developed and unnecessary photoresist 8 is removed, as shown in FIG. 9(*b*), photoresist 8 which has patterns of a groove section 8*b* and a pit section 8*a* corresponding to the groove 1 and the pit row 3 remain on the substrate 7.

Next, as shown in FIG. 9(*c*), the substrate 7 is dry-etched using the photoresist 8 as a mask. As to a concrete method of dry etching, a reactive ion etching in which halogen compound gas such as $CF_4$ is used as etching gas is suitable. When the photoresist 8 is removed after etching, as shown in FIG. 9(*d*), a groove pattern 7*b* according to the groove section 8*b* and a pit row pattern 7*a* according to the pit section 8*a* are formed on the substrate 7, and a land pattern 7*c* is formed between the adjoining groove patterns 7*b*.

Successively, as shown in FIG. 9(*e*), a metal layer 9 composed of Ni is formed by electroforming. When the metal layer 9 is peeled, as shown in FIG. 9(*f*), a stamper composed of the metal layer 9 which is provided with a protrusion 9*a* can be obtained. Plastic such as polycarbonate is formed by using the stamper so that a substrate for a magneto-optical disk having the desired groove 1 and a pit row 3 is produced. When a recording medium layer is provided on the substrate, the magneto-optical disk of the present invention can be obtained.

In addition, after the photoresist 8 is exposed by a laser beam according to patterns of the desired groove 1 and the pit row 3, a photomask may be produced, for example, as disclosed in Japanese Examined Patent Publication No. 4-2939/1992 (Tokukohei 4-2939). Then, the groove 1 and the pit row 3 are directly formed on a glass substrate by a contact exposing method and the dry-etching method using the photomask so that a magneto-optical disk may be produced.

In any case, formation of the groove 1 and the pit row 3 is started by exposing the photoresist 8 using an argon laser beam, for example. An apparatus for exposing photoresist using an argon laser beam is generally called a cutting apparatus, a method for forming the groove 1 and the pit row 3 using one argon laser beam is called an one-beam cutting method, and a method for forming them using two argon laser beams is called a two-beam method.

In the case where the pit row 3 is formed on the boundary section between the groove 1 and the land 2 as mentioned in the present embodiment, a three-beam method, for example, may be used. In this case, the groove 1 is formed by two beams and the pit row 3 is formed by one beam. With the three-beam method, a width of a groove can be controlled by changing an interval between two beams, and depths of a groove and a pit can be controlled by changing strength of each beam.

Figure 10:
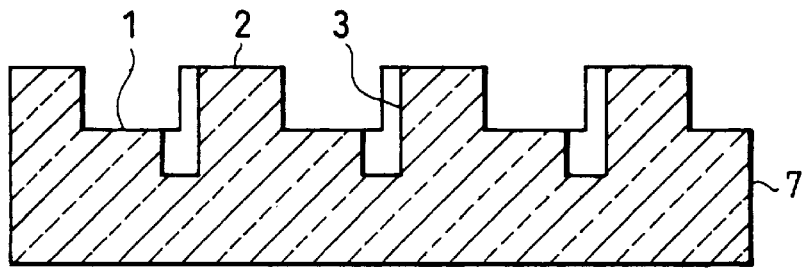
FIGS. 10(a) through 10(c) are longitudinal cross sections which schematically show variation in a shape which the pit rows shown in FIG. 1 can take.
Figure 10:
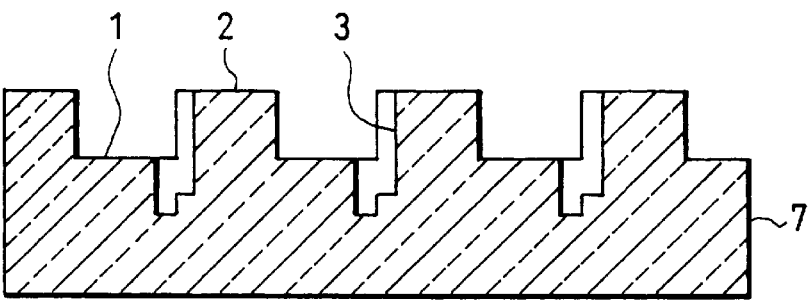
Figure 10:
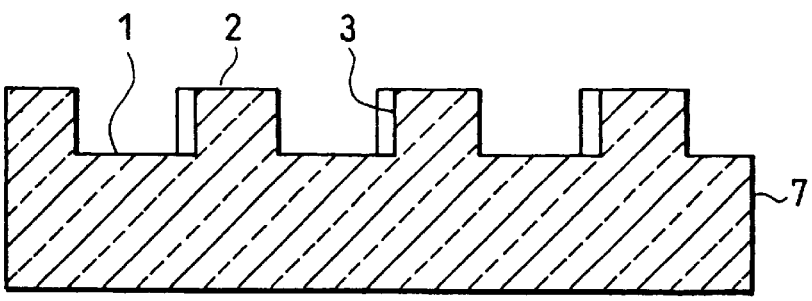

Here, in the above explanation, the depth of a pit in the pit row 3 is constant, but it is not always constant. As shown in FIG. 10(*b*), for example, the depth of the pit row 3 is different in a portion which belongs to the groove 1 and in a portion which belongs to the land 2, so differences in level may exist at a bottom of the pit row 3. In this case, there exists advantages that a limited scope of the width and depth of a pit in the pit row 3 becomes larger than a limited scope in the above embodiment and that the pit row 3 is easily formed because accuracy in the depth of a pit is relieved, namely, a magneto-optical disk can be easily produced.

In addition, as shown in FIG. 10(*c*), the depth of a pit in the pit row 3 and the depth of the groove 1 may be same. In this case, the pit row 3 is composed of semi-cylindrical pits, but it is not necessary that the depths of the pit row 3 and the groove 1 are different, so there exists an advantage that production becomes easier than the above embodiment.

The above embodiment described the magneto-optical disk, but the present invention can be widely applied to also an optical disk where address information is recorded using pits, such as a phase-changing type optical disk. Moreover, the present invention is also applicable to a write once read many type disk if a crosstalk cancelling technique for a recording signal is developed. Furthermore, the present invention is not limited to a disk-type optical recording medium, so it is also applicable to a card-type optical recording medium, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium comprising:
    a plurality of pairs of a groove and a land neighboring on each other, each of the groove and the land serving as a recording track;
    pits representing address information of the recording track, each of said pairs having said pits provided on a line offset from a centerline of the groove and from a centerline of the land; and wherein a pit width, Pw, of each of said pits satisfies the following relationship:

$$0.4T \leq Pw \leq 1.2T$$

where T is the track pitch of the recording track.

2. The optical recording medium as defined in claim 1, wherein the groove and land are formed respectively in a continuous form.

3. The optical recording medium as defined in claim 1, wherein said pits are formed more deeply than the groove.

4. The optical recording medium as defined in claim 1, wherein either of the groove or land includes a mark section with refractive index of a light which is different from refractive index of each groove and land, discrimination being made whether the recording track which is scanned by a light is a groove or a land based upon detection of said mark section.

5. The optical recording medium as defined in claim 4, wherein said mark section is a pit which has been locally formed in a vicinity of a center of either of each groove or land.

6. The optical recording medium as defined in claim 4, wherein said mark section is a pit which has been locally and linearly formed in a vicinity of a center of either of each groove or land.

7. The optical recording medium as defined in claim 5, wherein said mark section has a depth of approximately $\lambda/(4n)$ and a width of 0.3T to 0.4T where n is refractive index of a substrate of said optical recording medium, and $\lambda$ is a wavelength of a light to be emitted on the recording track.

8. The optical recording medium as defined in claim 1, further comprising a substrate, wherein said optical recording medium satisfies the following relationship:

$$T \geq 0.35 \times \lambda/NA$$

where $\lambda$ is a wavelength of a light which is emitted on the recording track, n is refractive index of said substrate, and NA is a numerical aperture of an objective lens for focusing the light on an optical recording medium.

9. The optical recording medium as defined in claim 1, further comprising a substrate, wherein said optical recording medium satisfies the following relationships:

$$T \geq 0.35 \times \lambda/NA$$

$$0.5T \leq Pw \leq 1.0T$$

where $\lambda$ is a wavelength of a light which is emitted on the recording track, n is refractive index of said substrate, and NA is a numerical aperture of an objective lens for focusing the light on an optical recording medium.

10. The optical recording medium as defined in claim 1, wherein the groove and land and said pits are formed so as to have different depths.

11. The optical recording medium as defined in claim 1, wherein said pits having a depth which is same as a depth of the groove.

12. An optical recording medium comprising:

a plurality of pairs of a groove and a land neighboring on each other, each of the groove and the land serving as a recording track;

pits representing address information of the recording track, each of said pairs having said pits located so signals detected therefrom have a substantially same signal intensity in the case where a light spot scans the groove and in the case where the light spot scans the land; and wherein a pit width, Pw, of each of said pits satisfies the following relationship:

$$0.4T \leq Pw \leq 1.2T$$

where T is the track pitch of the recording track.

13. The optical recording medium as defined in claim 12, further comprising a substrate, wherein said optical recording medium satisfies the following relationship:

$$T \geq 0.35 \times \lambda/NA$$

where T is the track pitch of the recording track, $\lambda$ is a wavelength of a light which is emitted on the recording track, n is refractive index of said substrate, and NA is a numerical aperture of an objective lens for focusing light on an optical recording medium.

14. The optical recording medium as defined in claim 12, wherein either of the groove or land includes a mark section with refractive index of a light which is different from refractive index of each groove and land, discrimination being made whether the recording track which is scanned by a light is a groove or a land based upon detection of said mark section.

15. The optical recording medium as defined in claim 14, wherein said mark section is a pit which has been locally formed in a vicinity of a center of either of each groove or land.

16. The optical recording medium as defined in claim 14, wherein said mark section is a pit which has been locally and linearly formed in a vicinity of a center of either of each groove or land.

17. The optical recording medium as defined in claim 15, wherein said mark section has a depth of approximately $(\lambda/4n)$ and a width of 0.3T to 0.4T where T is the track pitch of the recording track, n is refractive index of a substrate of said optical recording medium and $\lambda$ is a wavelength of a light to be emitted on the recording track.

18. The optical recording medium as defined in claim 13, wherein said optical recording medium satisfies the following relationship:

$$0.5T \leq Pw \leq 1.0T$$

T is the track pitch of the recording track.

19. The optical recording medium as defined in claim 12, wherein the groove and land and said pits are formed so as to have different depths.

20. The optical recording medium as defined in claim 12, wherein said pits having a depth that is same as a depth of the groove.

* * * * *